April 9, 1929.　　　　N. GELLA　　　　1,708,386
ELECTRICAL PROSPECTING DEVICE
Filed June 30, 1926　　2 Sheets-Sheet 1

Inventor:
Norbert GELLA
by
Lotka, Kehlenbeck & Farley
Attorneys.

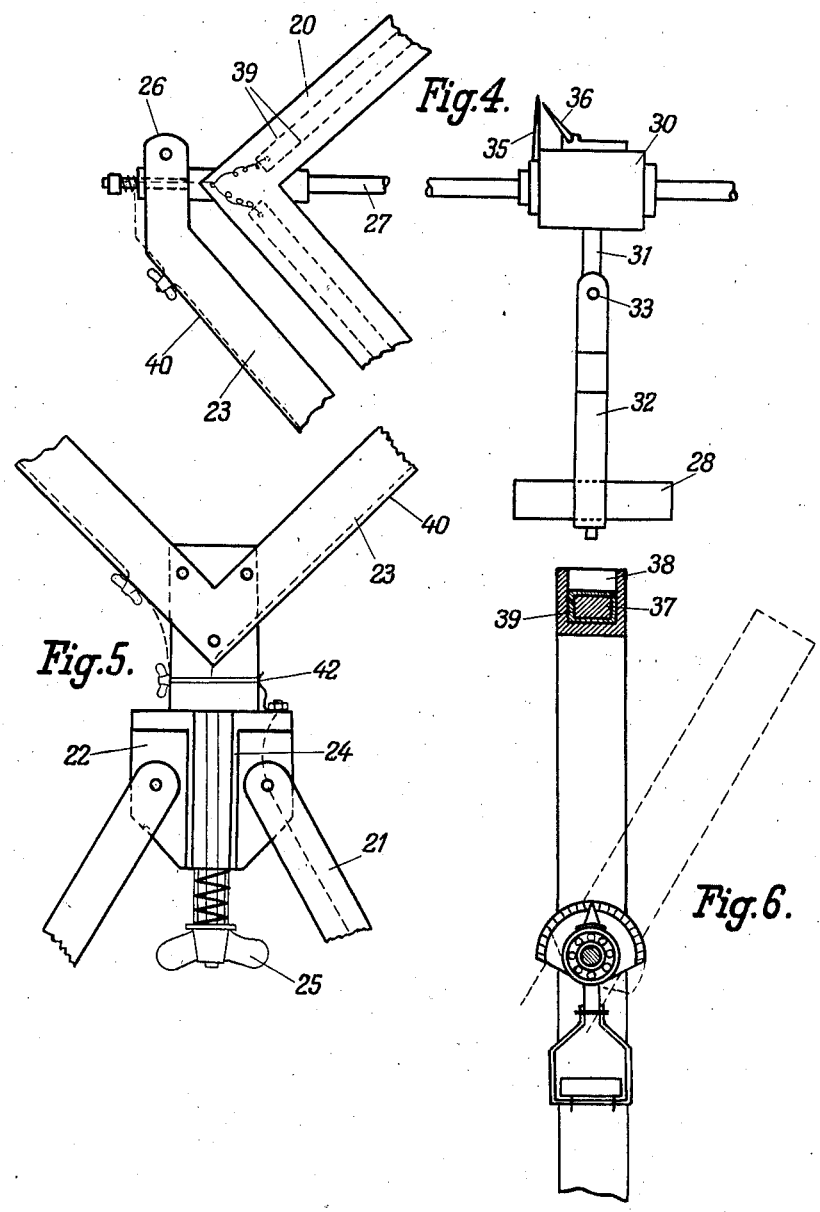

Patented Apr. 9, 1929.

1,708,386

UNITED STATES PATENT OFFICE.

NORBERT GELLA, OF CASSEL-WILHELMSHOHE, GERMANY, ASSIGNOR TO PIEPMEYER & CO. KOMMANDITGESELLSCHAFT, OF CASSEL-WILHELMSHOHE, GERMANY, A CORPORATION OF GERMANY.

ELECTRICAL PROSPECTING DEVICE.

Application filed June 30, 1926, Serial No. 119,589, and in Germany May 28, 1926.

This invention relates to means for determining the position of sections of the earth's crust of which the electrical conductivity differs from that of the surrounding material, in particular to a device for carrying out the method described in German Patent No. 415,188 for that purpose, and to improvements in the device described in this patent.

The device, described in the said prior patent and generally termed a "ring", has wire coils wound on a frame of circular or other shape and forms a detector of electrical currents in the earth. The ring wound with the wire is mounted on a stand. The course of the lines of force and of the lines of equi-potential may be determined, by means of the ring, from the position of the field produced by the electrical currents in the earth.

The object of the present invention is to obviate sources of error and disadvantages which have become apparent in working with the hitherto usual form of such a ring. One source of error is that capacity influences detrimental to the results of the investigations are exerted on the ring by masses situated in the neighbourhood of the device when in use, such as for example, the body of the person operating the instrument.

This source of error is obviated, according to the present invention, by the arrangement around the winding on the ring of an earthed protective sheath, consisting preferably of tin-foil or some other non-magnetic material equally capable of acting as an electrostatic shield without appreciably acting as an electro-magnetic shield.

Moreover, it has been found that the ring proper mounted on the stand is very heavy on account of the weight of the coil, which is of considerable length. The weight caused difficulties in the inclination of the ring about its axis, which was hitherto arranged beneath the ring proper, and in the determination of the maximum position of the current from the inclination. For this reason according to the present invention the horizontal axis about which the ring may be inclined is arranged higher than hitherto, being situated preferably approximately at the level of the centre of gravity of the ring but most advantageously in such a manner that it passes through the said centre of gravity.

It is then possible to mount or suspend the compass, necessary for the determination of the deviation from the north-south line, on this horizontal axis and thus to place it in a position in which it may be readily read whatever the inclination of the ring without it being necessary to secure the compass needle while the ring is inclined. The clinometer necessary is preferably combined with the suspension means for the compass or with the horizontal spindle.

The construction, arrangement, and assembly of the parts must be such that the device is capable of standing up to wind and weather and to rough handling on long journeys and during transport. Further, the assembly and replacement of parts must be simple.

A device of known type and an embodiment of a device according to the present invention are illustrated by way of example in the accompanying drawings, in which Fig. 1 illustrates a device of known type in front elevation;

Figs. 3 to 6 show details of the latter device on a large scale, Fig. 3 illustrating the suspension of the compass and the arrangement of the clinometer, Fig. 4 one of the side mountings of the device and the suspension means for the compass in side elevation, Fig. 5 the connection between the support for the device and the stand, and Fig. 6 part of the device in a section on line I—I (Fig. 2).

Figure 1:
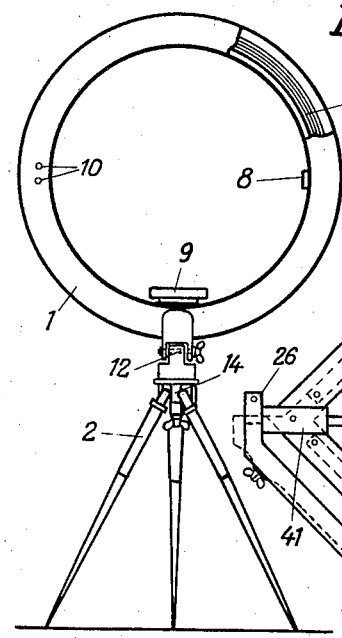

The device illustrated in Fig. 1 represents the construction hitherto usual for carrying out the method described in German Patent No. 415,188 and consists of a detector 1 proper, generally termed a "ring" in practice, which is mounted on the stand 2. Copper wire or the like 7 is wound around the circumference of the ring which is rotatable about a horizontal axis 12 and about a vertical axis 14. A clinometer 8, which generally consists of a bob and a calibrated scale, is employed to determine the angle of inclination. A compass 9 is secured to the lower part of the ring to enable the position of the ring relatively to the north-south line to be determined. Sockets 10, in which plugs for the connection of the telephones may be inserted, are provided in the ring. These sockets are connected with the terminals of the coil and it will be understood that telephones constitute but an example of a current indicating device. As is clear from Fig. 1 the horizontal axis 12, about which the ring may be inclined for the purpose of determining the position of maximum current strength, is situated completely outside the circumference of the ring. If the length of the wire wound on the ring is considerable (in recent models up to 5 kilometers of wire have been wound on a ring in order to obtain utmost range) then the ring is comparatively heavy and its handling, when inclined about the horizontal axis 12, is difficult. For this reason the horizontal axis of rotation of the ring is, in the device according to the present invention, disposed higher up so as to give a stable arrangement in which the ring 1 is in equilibrium in respect of the horizontal axis of rotation 12.

To simplify manufacture the ring (Fig. 2) may be made, not as a circular ring, but as a square frame 20, which, is, as before, supported on a stand 21. The ring consists of a strong non-conductive material, preferably wood. A two-armed support 23 is mounted on a pivot 24 in the upper part of the stand 22 (see Fig. 5) and may be secured in any desired position by a butterfly nut 25, preferably under the action of a spring. The amount of the rotation about the pivot 24, representing the vertical axis, may be read off on a calibrated scale (not shown), which is mounted on the top of the upper part of the stand 22.

Figure 2:
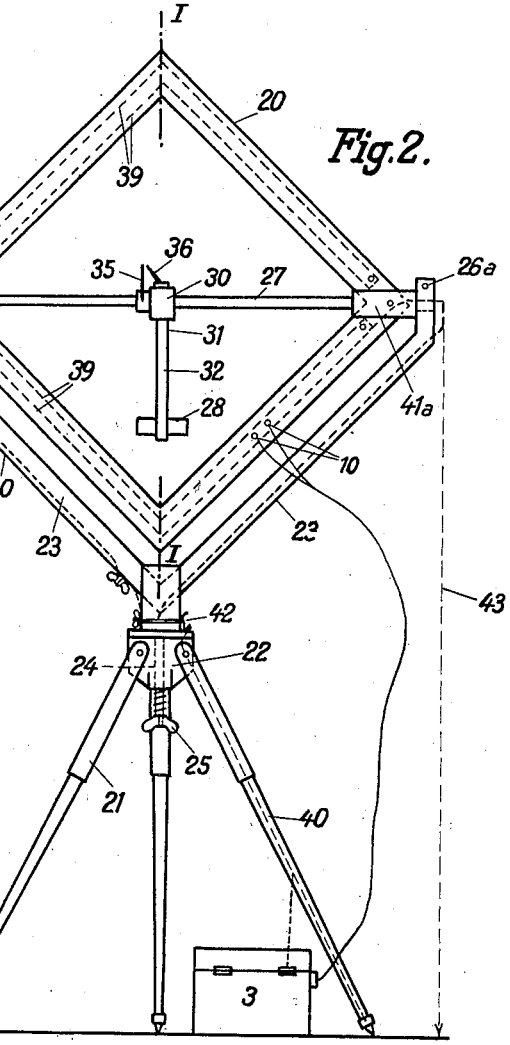
Fig. 2 is a similar view of a device according to the present invention.
Figure 3:
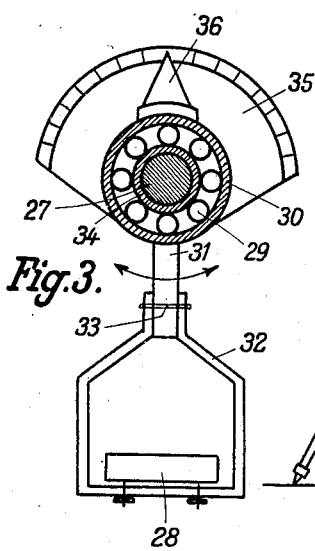

The support 23 has two bearings 26, 26ª in which a spindle 27, rigidly connected with the frame or ring 20, is journalled. This spindle is, with the square construction shown, preferably carried through two opposite corners. With a circular construction of ring the spindle would coincide with a diameter of the circle. As may be seen from Figs. 3, 4 and 6 a compass 28, for determining the deflection from the north-south line, is freely suspended from the spindle 27. A ball bearing 29, of which the outer race 30 is rigidly connected with a member or hanger 31, supporting a bow 32, which carries the compass 28, is provided on the spindle 27. The bow 32 and the member 31 are connected together by a pivot 33 disposed at a right angle to the spindle 27 in order that the bow may rotate with the compass. The axis of the pivot 33 thus lies in a plane perpendicular to the axis of the spindle 27. The inner race 34 is rigidly connected with the spindle 27 and carries a scale 35 preferably detachably secured, while the outer race 31 carries an indicator 36 which is preferably made so that on packing and during transport the indicator 36 may be folded up. The compass 28, may, therefore, swing about the spindle 27 in a plane perpendicular thereto and also about the pivot 33 in a plane extending through said spindle. In consequence, therefore, of the cardan suspension the compass will, on account of its own weight and that of the bow 32, always hang downwardly and adopt the same position so that, for every inclination of the ring 20, the compass needle is in the correct position. The compass 28 is secured in the bow 32 in such a manner as to be readily releasable. The inclination of the ring may be read off on the scale 35 which rotates therewith, while the indicator 36, in consequence of the manner of suspension of the compass and its arrangement on the outer race 30, always remains in its position, (cf. the position shown in Fig. 6 in dotted lines). This presents the advantage that the compass needle need not be arrested on inclining the ring. The arrangement of the windings 37 on the ring 20 may be seen in Fig. 6 from which it is clear that they are arranged in a groove 38. It is important that they should be entirely surrounded by an earthed sheath of tin foil 39 or a similar good conductor. The earthing of the sheath is effected by wires 40 carried outside the stand and over the bearing 26, 26ª. The sheath 39 is preferably, as shown in Figs. 2 and 4, constructed in two separate parts which are interrupted at the bearings for the rings, i. e. at 41 and 41ª. The formation of troublesome eddy-currents is avoided in this manner. Preferably the wire coil 37 is not in contact with the sheath 39, but an air space is left between them, which forms an insulation increasing the protective effect against external capacitative disturbances. It will be understood that such protection is present even when the sheath is in engagement with the wire coil but the provision of an air space between them increases this protective effect very materially.

The sheath 39 serves as a protective covering for the wire coils 37 and protects them against the capacity influence of masses situated in the neighbourhood of the device. Such capacity influences may in particular be exercised by the body of the person operating the device, and are also, as is well-known, dependent on the weather, errors of reading and adjustment varying therewith. These errors are avoided by the protective sheath 39 since the currents induced by the capacity situated in the neighbourhood of the device do not occur in the wire coils, but are conducted away outside by the earthed tin foil sheath and are led to earth. The connection of the leads 40 with the upper part of the stand 22 may be effected by means of a sliding contact 42 in order to ensure continuous connection between the protective covering and earth during rotation of the ring about the vertical axis 24. Should this sliding contact no longer act for any reason the earth connection may be effected directly from the bearings 26, 26ª as is indicated in Fig. 2 at 43. The earthing may further be effected through the zero conductor of an amplifier 3 which is also shown in Fig. 2. Sliding contacts for the connection of the protective covering 39 with the wires 40 leading to earth may also be provided in the bearings 26, 26ª.

I claim:—

1. A device for determining the position of sections of the earth's crust, of electrical conductivity different from that of their surroundings, comprising a universally mounted coil, by which the direction and intensity of the field produced by currents passed through the earth are determined, and a tubular sheath of good conducting material whereby the windings of the coil are protected against capacity influences to a greater degree than they are protected against electromagnetic influences.

2. A device for determining the position of sections of the earth's crust of electrical conductivity different from that of their surroundings, comprising a universally mounted coil, by which the direction and intensity of the field produced by currents passed through the earth are determined, and a tubular sheath of good conducting material whereby the windings of the coil are protected against capacity influences, said sheath being of non-continuous formation for the purpose of preventing eddy currents therein.

3. A device for determining the position of sections of the earth's crust of electrical conductivity different from that of their surroundings, comprising a universally mounted coil, by which the direction and intensity of the field produced by currents passed through the earth are determined, and a tubular earthed metallic sheath whereby the windings of the coil are protected against capacity influences, the said sheath being non-continuous for the purpose of preventing eddy currents therein.

4. A device for determining the position of sections of the earth's crust, of electrical conductivity different from that of their surroundings, comprising a universally mounted coil, by which the direction and intensity of the field produced by currents passed through the earth are determined, and a tubular non-magnetic sheath of good conducting material whereby the windings of the coil are protected against capacity influences, said sheath being of non-continuous formation for the purpose of preventing eddy currents therein.

NORBERT GELLA.